Sept. 10, 1968  J. E. STEELE, JR  3,401,314
ELECTROLYTIC CAPACITOR HAVING A COVER WITH SEALING
AND VENTING MEANS THEREIN
Filed March 7, 1966

INVENTOR:
JACK E. STEELE,
BY Henry T. Olsen
HIS ATTORNEY.

United States Patent Office 3,401,314
Patented Sept. 10, 1968

3,401,314
ELECTROLYTIC CAPACITOR HAVING A
COVER WITH SEALING AND VENTING
MEANS THEREIN
Jack E. Steele, Jr., Columbia, S.C., assignor to General
Electric Company, a corporation of New York
Filed Mar. 7, 1966, Ser. No. 532,324
6 Claims. (Cl. 317—230)

ABSTRACT OF THE DISCLOSURE

An electrolytic capacitor having an insulating cover with an improved sharp edge sealing means and pressure relief rupturing means therein.

---

The present invention relates to electrical capacitors and more particularly to a seal assembly for a capacitor such as an electrolytic capacitor.

A frequent cause of failure of electrolytic capacitors is the loss of electrolyte through inadequate seals provided for the capacitor case. Such loss leads to variation and degradation of the electrical properties of the unit, as well as premature breakdown. Prior seal structures used for electrolytic capacitors have not in general provided entirely satisfactory results for various reasons. For example, certain of the prior seal structures have not adequately prevented escape of the electrolyte liquid or vapor emanating therefrom, while in those cases where such escape was effectively prevented, the buildup of vapor or gas pressure within the unit often resulted in ejection of the end seal.

It is an object of the invention to provide a seal structure for electrical devices, especially electrolytic capacitors and the like, which provide an effective and long-lasting seal and avoids the disadvantages of the prior art structures of this type.

It is another object of the invention to provide a seal structure of the above type which is characterized by a strong, electrically insulating, hermetic seal preventing escape of the contained liquid or vapor, which has high mechanical strength to resist ordinary internal pressure, which forms an effective vapor barrier, and which is economically and readily produced.

It is still another object of the invention to use a preformed cover or cap which is composed of a material which is readily hermetically sealed to the material of the capacitor casing without the use of intermediates or adhesives to effect bonding and permits use of a minimum amount of the rolling pressure required to assure a good seal even though a bonding intermediary is not used.

In forming capacitors with strong hermetic seals of the type contemplated by the invention, venting of the capacitor is required to release excessive pressures which might develop within the capacitor due to malfunctioning or misuse. During a misuse, excessive pressure may develop due to heating or gases may evolve from the electrolyte due to electrolysis. Unless this pressure is relieved while still relatively small it may continue to increase to explosive magnitude and result in violent eruption of the capacitor. It is, therefore, a further object of the invention to provide a preformed cover or cap having venting means as an integral part thereof to prevent such occurrence.

In accordance with the aforementioned objects there is provided an electrolytic capacitor comprising a casing having an open end, a capacitor section within the casing, electrical connection means extending from the capacitor through the open end and a seal assembly hermetically closing the open end of the capacitor casing and electrically insulating the electric connection means from the casing, said seal assembly comprising a cover means composed of semi-rigid polymeric material having sufficient elasticity to conform and bond to the casing. The cover means is provided with a thin section which vents the capacitor upon development of undue internal pressure.

Further objects and advantages of the invention will be understood as the following complete description proceeds and from the drawings wherein.

Figure 1:
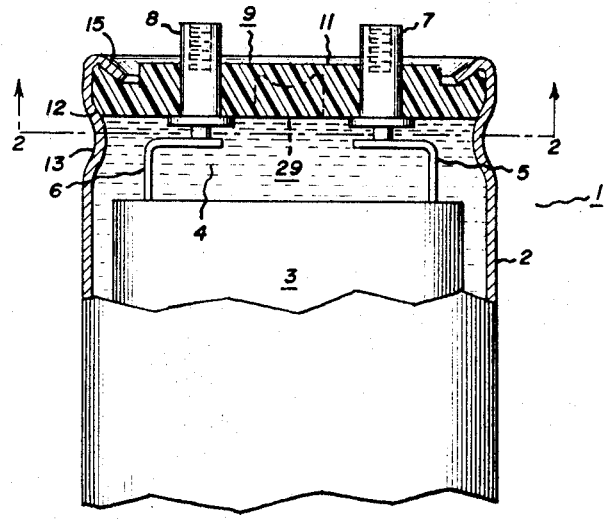
FIG. 1 is an elevational view, partly in section, of an electrolytic capictor embodying the invention.

Referring now to the drawing, and especially to FIG. 1, there is shown an electrolytic capacitor 1 comprising a cup-shaped casing 2 preferably made of a metal such as aluminum containing a rolled or other capacitor section 3, conventionally made of a pair of convolutely wound, film-forming metal electrode foils separted by paper or other dielectric spacer material, and liquid electrolyte 4 which fills the casing and impregnates capacitor section 3. Electrolyte 4 may be of any conventional or known type of capacitor electrolyte, as, for example, an aqueous ammonium pentaborate-glycol solution and it may be of liquid, gel, paste or other form. Terminal leads 5 and 6 are connected to the respective foils and extend outwardly from the end toward the opening of casing 2, the terminals and the foils to which they are respectively connected having oposite porality in the operation of the capacitor unit. Leads 5 and 6 may be of film-forming metal and may be welded thereto terminal post members 7 and 8. In a usual construction casing 2 is cup-shaped with one open end sealed by a seal assembly 7 having the structure, composition and arrangement provided in accordance with the invention, as more fully described herein. While the seal structure for only one end of the capacitor casing is shown and described in connection with each figure, it will be understood that if the casing is tubular with both ends open the opposite open end may have the same type of seal structure therein.

It should also be understood that the described seal structures could be employed in types of capacitors other than those shown. For example, casing 2 could contain an anode of suitable type (such as a sintered slug or wound foil anode) inserted therein instead of capacitor section 3, the casing serving as the cathode and having terminal soldered to its bottom end, all as well known in the art. The seal structure may also be used in nonpolar capacitors.

In accordance with the invention, a novel end seal structure 9 forms the closure for the open end of capacitor casing 2 to retain the electrolyte 4 therein, and provide therefor a strong, fluid-tight seal both around the interior surface of the casing and around the terminal posts 7 and 8 which pass therethrough, while electrically insulating the terminal posts from casing 2.

Figure 2:
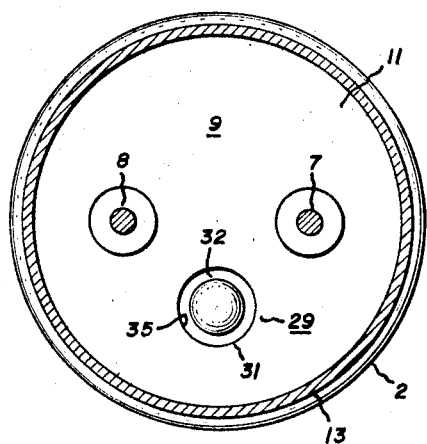
FIG. 2 is a section view along line 2—2 of FIG. 1.
Figure 3:
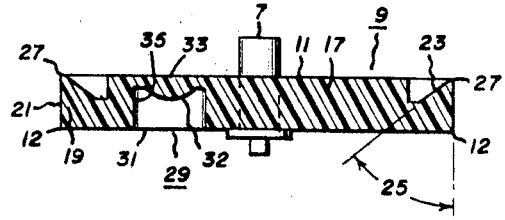
FIG. 3 is a section view of the cover.

The seal structure 9 comprises a preformed cover or cap 11 of semirigid polymeric material such as polypropylene having an inner edge 12 tightly contacting a bead 13 adjacent the open end of the casing 2. A rolled flange 15 formed from the open end of casing maintains said cover 11 tightly between said bead and said flange. As shown in FIGS. 1–3, the cover 11 comprises a main body portion 17 of flat cylindrical, or disc shape. A peripheral flange 19 is molded integrally with the body portion 17 and provides as outer cylindrical surface portion 21 which sealingly engages the inner wall of the casing 2 to form the hermetic seal therebetween. A sloping surface 23 (the upper or exterior surface as viewed FIG. 3) of the flange is beveled so as to define an included angle 25 with the surface portion 21 which is less than 60°, preferably 45°, and provides a pointed or "sharp" edge 27 on the flange 19. The sharp edge 27 provides the cover with enhanced sealing properties because it conforms generally to the interior surface of the casing engaged therewith while still retaining sufficient memory to tend to return to its molded shape. Therefore, as shown in FIG. 1, the sharp edge 27 has been rounded to conform to the shape of rolled flange 15 and the tendency of the cover member to return to its molded shape maintains a steady force against the inner surface of the flange 15 and provides a hermetic seal of great durability. The use of polypropylene as the cover material is preferred since this material can be characterized as semirigid, i.e., basically a rigid material which will maintain the terminal posts in their proper position while still having sufficient elasticity to not crack when the casing 2 is rolled about a cover molded therefrom. The use of the sharp edge 27 reduces the amount of pressure required in rolling the casing snugly about the cover, thereby assuring less likelihood of cracking of the cover during the sealing operation.

The cover member is provided with a venting means 29 which will burst upon the development of a predetermined amount of pressure within the capacitor. This venting means 29 comprises a cylindrical recess 31 having a bottom 32 defined by a relatively thin cross-section cover portion 33 adajacent the exterior surface of the cover 9 and side walls 35 defined by the relatively large cross-section of the body portion 17 of the cover. The bottom 32 is convex due to the variable-thickness or dome-shape of the cover portion 33 to control the predetermined amount of pressure required to burst the venting means. Thus, the radius of curvature used in defining the dome-shape can be larger or smaller to decrease or increase the surface area of the bottom 32 and proportionately increase or decrease, respectively, the pressure at which the capacitor will vent.

While the cover member 9 may be manufactured by any suitable method, it is preferred that it be produced by injection molding. Thus, the venting means 29 can be advantageously molded directly into the cover eliminating the need for boring or grinding of the recess to form the thin cross-section cover portion 33. The dome shape of this portion eliminates air bubbles or other defects which might otherwise adversely affect the functioning of the venting means 29.

There is thus provided by the invention a seal structure which provides excellent retention of the fill electrolyte of the capacitor over long periods of time and thus significantly contributes to maintaining the electrical properties of the capacitor substantially constant. In this way, the invention makes possible electrolytic capacitors of extremely high reliability, even over a wide temperature range of −55° C. to 125° C. and higher.

Although the invention has been described principally with respect to electrolytic capacitors, it will be evident that the described seal structure may have application to other electrical devices where maintenance of a strong fluid-tight seal for the container of the electrical device is of importance.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical capacitor comprising a casing having an open end and containing therein an electrolyte and a capacitor section immersed in said electrolyte, an electrical connection extending outwardly from said capacitor section through said open end, and a seal assembly hermetically closing the open end of the capacitor casing and electrically insulating the electrical connection from said casing, said seal assembly comprising a disc-shaped end cover composed of semirigid material having two rim surfaces in an acute angle relationship to define a sharp edge about its periphery, and rolled flange portions of said casing tightly engaging said surfaces and sharp edge.

2. An electrical capacitor as recited in claim 1 wherein said sharp edge is defined by two surfaces of said cover and the acute angle between said surfaces is less than 60°.

3. An electrical capacitor as recited in claim 2 wherein said capacitor is provided with venting means to prevent explosive bursting of the capacitor.

4. An electrical capacitor as recited in claim 3 wherein said end cover is composed of polypropylene.

5. An electrical capacitor comprising a casing having an open end and containing therein an electrolyte and a capacitor section immersed in said electrolyte, an electrical connection extending outwardly from said capacitor section through said open end, a seal assembly hermetically closing the open end of the capacitor casing and electrically insulating the electrical connection from said casing, said seal assembly including an end cover tightly engaging the interior wall of said casing, said cover with a cup-shaped recess therein having a convex bottom and said bottom being rupturable to prevent explosive bursting of the capacitor and venting means for preventing explosive bursting of the capacitor, said venting means comprising a thin cross-sectioned portion of the seal assembly.

6. An electrical capacitor as defined in claim 5 wherein said cover is provided with a sharp edge on its periphery which is tightly engaged by a rolled flange portion of said casing.

References Cited

UNITED STATES PATENTS

| 1,213,182 | 1/1917 | Gardiner | 136—177 |
| 1,366,298 | 1/1921 | Tietelbaum | 317—230 |
| 2,199,519 | 5/1940 | Collins et al. | 317—230 |
| 1,949,953 | 3/1934 | Clark | 317—230 |
| 3,197,547 | 7/1965 | Peace et al. | 317—230 |
| 3,292,054 | 12/1966 | Burnham | 317—230 |

JAMES D. KALLAM, *Primary Examiner.*